Patented Sept. 16, 1952

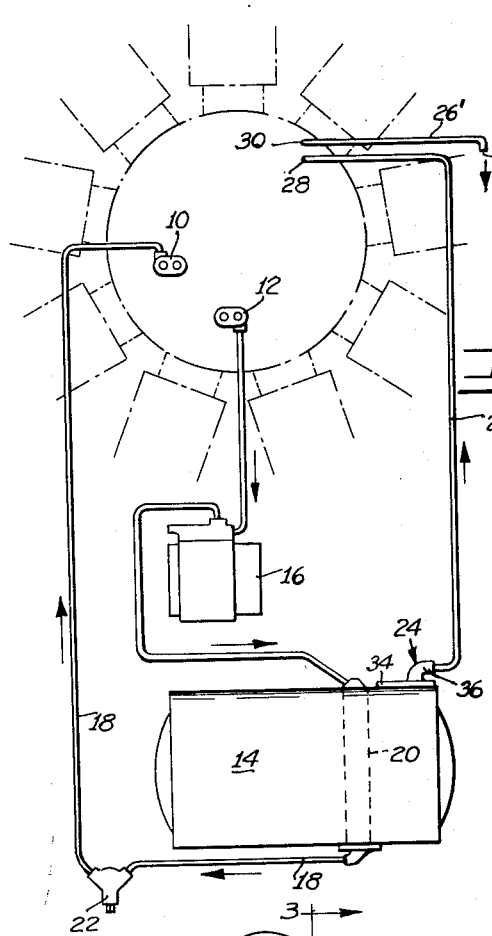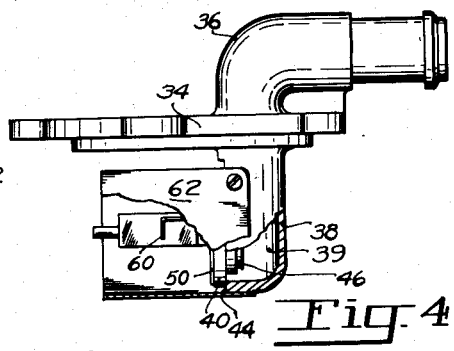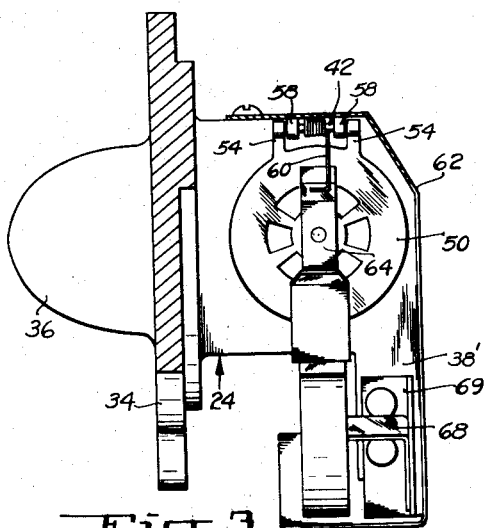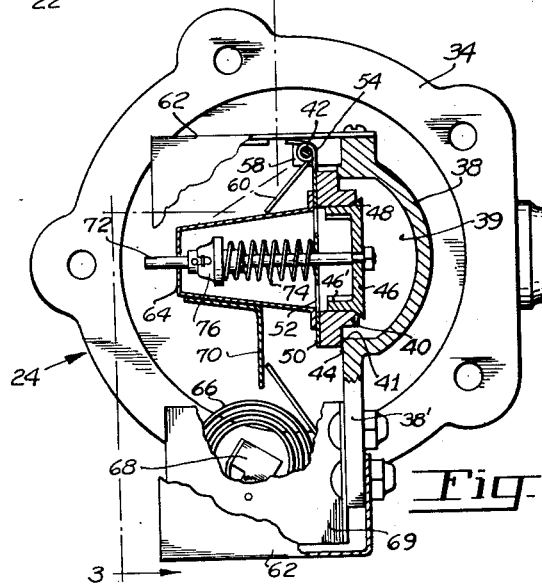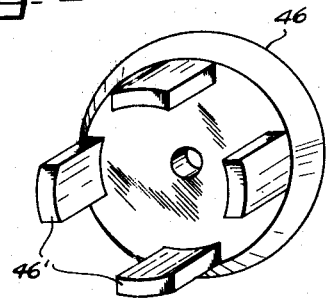

2,610,705

UNITED STATES PATENT OFFICE 2,610,705

OIL TANK PRESSURIZING CONTROL

John F. Kirkbride and John D. Mayer, Seattle, Wash., assignors to Boeing Airplane Company, Seattle, Wash., a corporation of Delaware Application November 16, 1948, Serial No. 60,238

6 Claims. (Cl. 184—6)

This invention pertains to lubrication systems for aircraft engines and particularly to those of the dry sump type, or the like, and is primarily concerned with the problem of venting and controlling the air pressure developed or produced in the oil supply tank. Because of the possibility of air locks forming in the oil supply line at the reduced atmospheric pressures prevailing at the higher altitudes, or air being carried to the engine with the oil, it is desirable to create this air pressure in the supply tank to force the oil uniformly to the engine lubricating pump at all times. However, such air pressure must not be allowed to exceed the maximum value which the oil supply tank and connections can safely withstand, thus requiring the use of air pressure relief valve mechanism in communication with the tank.

When the engine is operating normally and the lubricating oil is at elevated temperature, the hot oil vapors do not in the least interfere with the operation of pressure responsive relief valve mechanism controlling air pressure in the supply tank. However, when the engine is stopped and the oil cools, accompanied by a drop in air pressure and temperature in the supply tank, there is a serious tendency toward freezing of the valve, such as by oil condensing and congealing on the pressure sensitive valve mechanism parts, binding them closed and rendering them inoperative for initial use when the engine is next started. Consequently when the engine is next started, and until the temperature in the supply tank rises sufficiently, such as to heat and soften the congealed oil to free the valve parts, air pressure in the supply tank can rise excessively and create a dangerous pressure condition conducive to rupture or damage of the supply tank.

Accordingly, it is a primary object of this invention to devise an air venting system for the supply source of a lubrication system, and special valve mechanism implementing the system or method, reliably operable to vent air from the supply tank upon starting the engine cold, as well as to regulate maximum air pressure therein normally. An important feature of the invention lies in the use of a temperature-responsive valve operable to vent the oil supply tank when temperature therein falls below a predetermined value, and to remain open until temperature again rises above a value at which oil congealed on the valve softens, such operation occurring independently of the normal pressure-actuated operation of the valve mechanism. Preferably, and as illustrated, the mechanism includes a poppet type pressure-responsive valve normally operable to vent air under pressure from the tank, and a coacting clack valve actuated as described by a thermostatic element and arranged to by-pass the poppet valve when temperature is low, although air pressure may then likewise be low.

The particular details of the system of control utilized and of the construction of the preferred valve mechanism, in conjunction with an illustrative engine lubricating system, will become further apparent from the following description based upon the accompanying drawings.

Figure 1 is a schematic diagram showing an illustrative lubricating system embodying the invention as applied to a radial type aircraft engine.

Figure 2 is a bottom view of a preferred vent unit for the oil supply tank, embodying valve mechanism including features of this invention.

Figure 3 is a transverse sectional view taken on the line 3—3 of Figure 2, and Figure 4 is a side view of the device shown in Figure 2 with parts broken away.

Figure 5 is a isometric view of a form of poppet valve element employed.

In Figure 1 the aircraft engine is outlined simply by dot-and-dash lines, viewed in the direction of its shaft axis. The lubricating pump is designated 10 and the scavenge pump, 12. The oil supply tank or reservoir 14 is connected in series with an oil cooler 16 which reduces the temperature of oil withdrawn from the sump by the scavenge pump 12, before the oil passes back into the supply tank 14. The lubricating pump 10 draws oil from the supply tank 14 through the supply line 18 connected to the bottom of the supply tank directly in alignment with the opening through the perforated cylindrical hopper 20 of the tank, the latter serving in well known manner to confine the path of oil circulating through the supply tank initially upon starting the engine cold to expedite heating the lubricating oil to operating temperature. This arrangement of the supply tank and hopper and the details of the cooler 16 and of the pumps 10 and 12 connected in the lubricating circuit are commonplace and require no detailed description herein. A drain cock 22 in the supply line 18 enables draining the oil from the system when necessary.

In the operation of the dry sump type engine lubricating system the scavenging pump 12 must operate at a capacity substantially above that of the lubrication pump 10 if the sump is to be kept dry. Necessarily, therefore, the scavenging pump draws large quantities of air from the sump in addition to the oil and forces the mixture of oil and air through the oil cooler 16 and into the oil supply tank 14. Especially at high altitudes reduced atmospheric pressure results in a tendency for air entrained in the system to separate from the oil and create bubbles or a vapor lock in the supply line, so that there will not be a sufficient supply of oil reaching the pump for delivery to the engine. Thus, unless air pressure in the supply tank 14 is kept above a predetermined value there will be no assurance of a solid flow of oil to the engine. For other reasons as well, as previously stated, a pressure type supply tank is highly desirable, yet the pressure must be limited to a reasonable value to avoid mechanical failures due to excessive pressures, necessitating pressure regulation.

According to the invention, I provide automatic vent means associated with the tank, such as vent unit 24, including valve mechanism operable, in the illustrated case, in response to air pressure in the tank and cooperable valve mechanism responsive to tank temperature. A vent line 26 extends from the vent unit 24 back into the crankcase of the engine at location 28 where it terminates, and a vent line 26' forming an exit from the crankcase at a second point 30 carries the vented air overboard at 32. This interposition of the crankcase in the vent line 26, 26', retains in the system any oil carried as foam out of the supply tank with the vented air, rather than allowing this oil to be spilled overboard.

As illustrated, the vent unit 24 includes a casing or housing 34 having a mounting flange bolted conveniently to the upper side of the supply tank 14, and a pipe elbow 36 (Figure 4) projecting from the plane of the flange out of the tank and connected to the vent pipe 26. The vent unit has a downwardly projecting housing portion 38 defining an outlet duct 39 communicating with the supply tank and defining a valve port.

The valve mechanism controlling passage of air through such port and duct into the vent elbow 36 is mounted on this casing portion 38. As shown in Figure 2, such mechanism includes the clack valve 40 pivoted to swing about a pin 42 defining a horizontal axis, for seating on the valve port 41 against the annular shoulder 44 formed by the housing portion 38. A poppet valve 46 is mounted to close a central opening in the clack valve 40, seating against a beveled edge 48 of the latter, to allow escape of air when the clack valve is closed. In the structural sense the poppet valve preferably forms an element of the clack valve assembly, being carried wholly by the clack valve, although they operate differently and independently. As will appear, the clack valve is temperature-controlled, being closed when temperature in the supply tank 14 exceeds a predetermined value, such as 100 degrees F., at which congealed oil softens sufficiently to free the poppet valve, and opening automatically at lower temperatures. The poppet valve is pressure-actuated, opening in response to pressures in the supply tank above a predetermined maximum operating value.

The clack valve 40 preferably is a ring secured upon a hinged mounting plate 50 having several air passage openings 52 located in its central portion and registering with the opening in the clack valve ring leading into the valve port 41. The disk 50 has a pair of supporting hinge arms 54 which embrace the pivot pin 42 carried by the fixed mounting lugs 58. A coil spring 60 encircling such pin reacts between a valve cover 62 bolted to the casing extension 38, and a U-shaped strap 64 having opposite ends secured to the face of plate 50 opposite that to which the ring clack valve 40 is secured. This spring urges the clack valve to swing about pin 42 toward closed position (Figure 2).

Arranged to exert a force on the clack valve assembly opposed to the force of spring 60 is the thermostatic element 66 carried by a bracket 68 anchored to the fixed mounting 69, as shown in Figures 2 and 3. Such thermostatic element may take the form of a helical bimetallic coil, as shown, of conventional type having the metal of higher coefficient of expansion in the inner side of the coil. The free end of such helical thermostatic coil is located to contact and press against a tab 70 projecting from the side of the U-shaped strap 64 remote from the spring 60, shown in Figure 2, as the oil cools after operation of the engine ceases. The force thus produced by the thermostatic element is great enough to overcome the resilient pressure of spring 60, as well as of any residual air pressure in the tank, and to swing the clack valve 40 away from its seat into open position.

Aligned apertures are formed centrally in the plate 50 and in the central portion of strap 64, respectively, which receive and guide the poppet valve stem 72 for axial movement to open and close the poppet valve 46. As shown in Figure 5, such poppet valve has axially projecting guide fingers 46' slidable inside the clack valve ring 40, which insure proper seating of such poppet valve against the annular shoulder 48. A helical spring 74 encircling the valve stem 72 reacts from the side of plate 50 remote from the poppet valve, against a collar 76 secured on the valve, to urge the poppet valve toward closed position against the force of air pressure in the supply tank.

It will now be evident that this dual valve mechanism includes a temperature responsive valve 40 capable of by-passing the pressure-actuated valve 46 to vent the supply tank 14 after the engine has stopped and the oil in the supply tank has cooled. When the temperature drops to a predetermined temperature, well above the congealing temperature of the oil, the thermostatic element 66 is adjusted, with relation to the force of spring 60 opposing it and residual air pressure in the tank, to swing the clack valve element 40 about its pivot 42 away from shoulder 44 of the vent casing portion 38, thus providing an open valve port. Oil vapor laden air then in the supply tank and under pressure is thereby permitted to escape through the passage 39 and out the elbow 36 into the vent pipe 26.

As a result, the residual oil vapor present in the supply tank, which is at atmospheric pressure, will be slight and usually insufficient to bind the poppet valve 46 shut by congealing; moreover, even though oil should congeal on the poppet valve parts, binding them to the clack valve parts so that the poppet valve would not be opened by the desired operating pressure in the supply tank, the tank would not be sealed because of the opening afforded by the thermostat-opened clack valve 40. As soon as the engine warms up at the beginning of the subsequent operation the oil congealed about the poppet valve softens and frees the valve. During such warm-up period of the engine, and until the oil-softening temperature is reached and the poppet valve freed, the clack valve is held open by the thermal coil 66, preventing excessive pressure in the supply tank.

As normal operating temperature is reached, the thermostatic coil 66 is wound up more tightly, thus relieving its pressure on the tab 70, and allowing spring 60 to swing the clack valve closed. Then free, the poppet valve is opened as pressure in the tank increases, but only sufficiently to relieve air pressure in the supply tank in excess of the selected operating value, vented air passing through the clack valve ring into the duct 39.

It will therefore be evident that the invention provides a reliable and simple arrangement for insuring adequate pressure in the supply tank to prevent vapor locks or air bubbles carried by the oil passing through the supply line of a dry sump type engine or equivalent installation presenting related problems of venting a fluid suply source, while protecting against excessive air pressure in the system not being relieved because of freezing of valve parts, such as by congealing of oil thereon. Particular features of the invention are the system, the novel temperature controlled valve and inclusion in its mechanism of a pressure operated valve.

We claim as our invention:

1. In a system of lubrication, the combination comprising a lubricant storage container having a storage capacity sufficient in relation to its normal lubricant content to provide an air space in the top portion of its interior, means operable to circulate lubricant to and from said container and to affect accumulation of air in such top portion, vent valve means leading from such top portion, operable to control escape of air from said container and thereby from the system, means responsive to the temperature within said container and operable to open said valve means upon decrease in such temperature below a predetermined value, and means responsive to pressure of air in said container and operable to open said valve means to relieve air under pressure above a predetermined value.

2. In a system of lubrication, the combination comprising a lubricant storage container having a storage capacity sufficient in relation to its normal lubricant content to provide an air space in the top portion of its interior, means operable to circulate lubricant to and from said container and to effect accumulation of air in such top portion, a first air-vent valve leading from such top portion, operable to control escape of air from said container and thereby from the system, means responsive to the temperature within said container and operable to open said valve upon decrease in such temperature below a predetermined value, a second air-vent valve leading from such top portion, operable to control escape of air from said container and thereby from the system, and means responsive to pressure of air in said container and operable to open said second air-vent valve to relieve air under pressure above a predetermined value when said first valve is closed.

3. For a lubricating system, in combination, a storage container for lubricant subject to temperature variations, said container having an upper air space in the top portion of its interior to accumulate air from the system, a first vent valve means leading from said air space in said container, operable to open automatically in response to temperatures within said container below a predetermined value, and a second vent valve means by-passing said first valve means and operable to open automatically in response to pressures of air in said container above a predetermined value.

4. The lubricating system for a dry-sump type engine, or the like, comprising an oil reservoir, lubricating pump means operable to draw oil from said reservoir and supply it to the engine, scavenge pump means operable to return oil to said reservoir from the engine's sump, and automatic vent means operable to vent air from said reservoir, said vent means including a first valve operable to open automatically in response to reservoir temperatures below a predetermined value and a second valve, in by-passing relation to said first valve, operable to open automatically in response to reservoir air pressures above a predetermined value.

5. In a system of lubrication, the combination comprising a lubricant supply container having a storage capacity sufficient in relation to its normal lubricant content to provide an air space in the top portion of its interior, means operable to withdraw lubricant from said container and to return lubricant thereto, and including means operable to supply pressure-air to said container to increase the pressure of air in such air space therein, pressure relief valve means leading from such top portion, operable to limit such pressure by venting air when such pressure exceeds a predetermined value, and temperature responsive means operatively connected to said relief valve means and operable automatically in response to air temperature dropping below a predetermined value to operate such valve means to allow escape of air by way of such valve means.

6. The lubricating system for a dry-sump type engine, or the like, comprising an oil reservoir, lubricating pump means operable to draw oil from said reservoir and supply it to the engine, scavenge pump means operable to return oil to said reservoir from the engine's sump, and automatic vent means operable to vent air from said reservoir, said vent means including valve means, means operable to open said valve means automatically in response to reservoir temperatures below a predetermined value, and means operable to open said valve means automatically in response to reservoir air pressures above a predetermined value.

JOHN F. KIRKBRIDE.
JOHN D. MAYER.

REFERENCES CITED

The following references are of record in the file of this patent:

UNITED STATES PATENTS

| Number | Name | Date |
|---|---|---|
| 1,744,636 | Holmberg | Jan. 21, 1930 |
| 2,316,729 | Tryon | Apr. 13, 1943 |
| 2,379,109 | Shaw | June 26, 1945 |
| 2,400,911 | Booth | May 28, 1946 |
| 2,435,359 | Landis | Feb. 3, 1948 |
| 2,456,886 | Mori | Dec. 21, 1948 |
| 2,464,063 | Streid | Mar. 8, 1949 |

FOREIGN PATENTS

| Number | Country | Date |
|---|---|---|
| 461,707 | Great Britain | Feb. 23, 1937 |